United States Patent Office 3,475,935
Patented Nov. 4, 1969

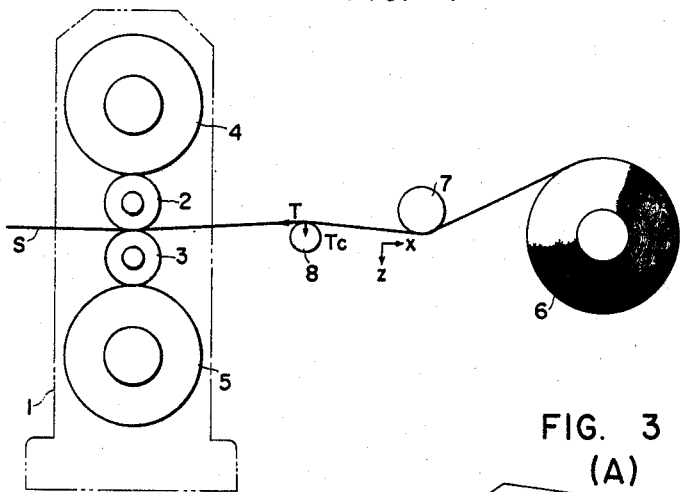
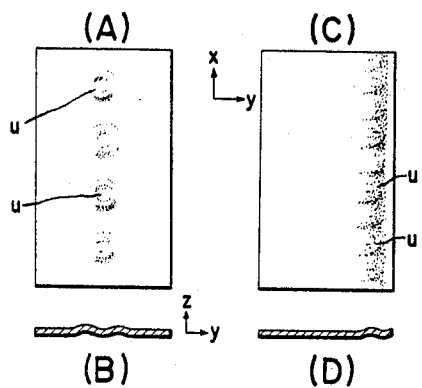
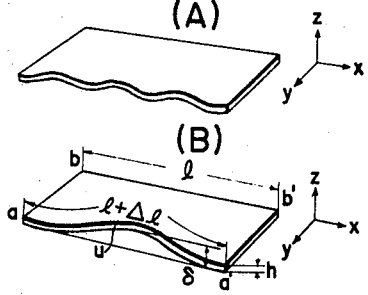
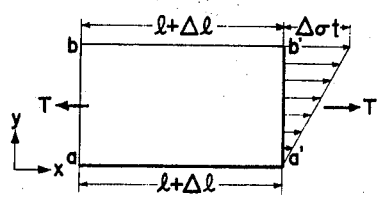
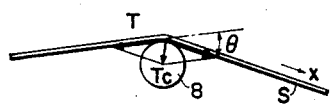

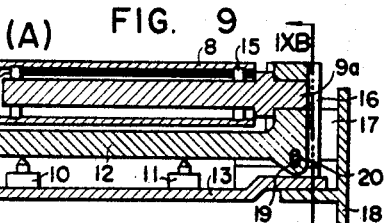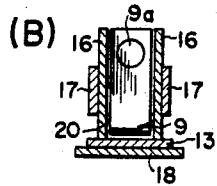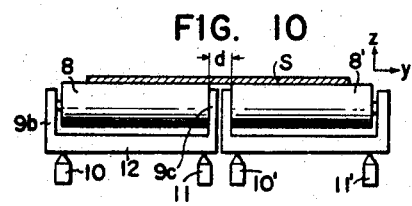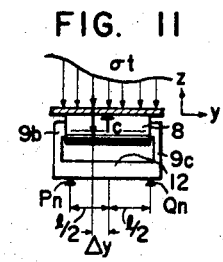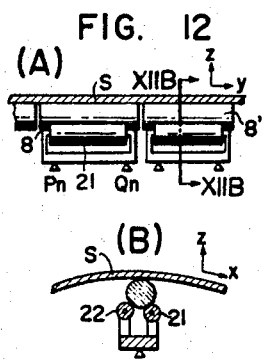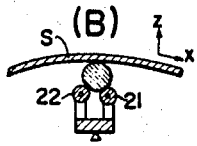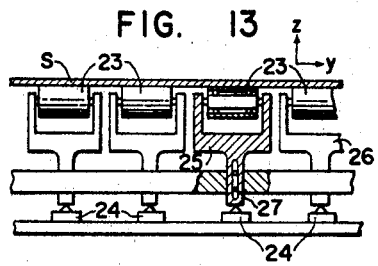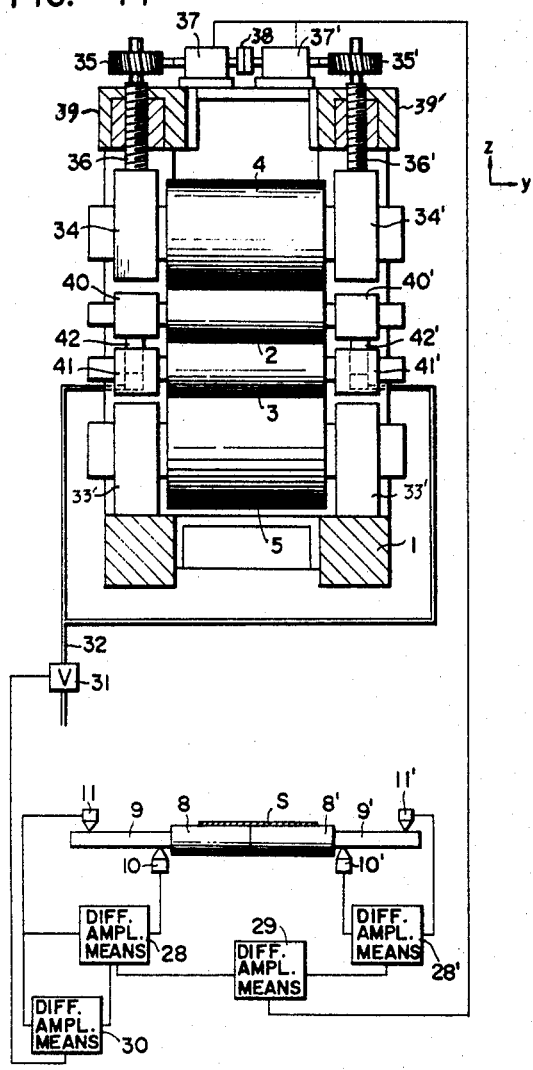

3,475,935
CONTROL APPARATUS AND SYSTEM FOR STRIP ROLLING
Toshiyuki Kajiwara, Hitachi-shi, Japan, assignor to Hitachi, Ltd., Chiyoda-ku, Tokyo-to, Japan
Filed Oct. 28, 1966, Ser. No. 590,405
Claims priority, application Japan, Oct. 29, 1965, 40/65,970
Int. Cl. B21b 37/04, 37/12, 39/08
U.S. Cl. 72—9          20 Claims

ABSTRACT OF THE DISCLOSURE

An apparatus is described for detecting potential undesired variations in the flatness of a strip material during strip rolling operations in which the strip is rolled under pressure to conform the strip to a desired shape. The apparatus includes tensioning rollers for imparting a tension force to the strip together with a sensing device for sensing the tension at multiple spaced points across the width of the strip including at least one point between the edge parts of the strip. A signal developing circuit is operatively coupled to the sensing device for providing a signal corresponding to the profile of the distribution of the tension imparted to the strip across the width. The sensing device comprises a first sensor arrangement for deriving a differential force signal representative of the difference in force produced at multiple spaced points across the width of the strip due to tension, and signal processing circuitry for deriving a turning moment signal representative of the turning moment produced about at least one of the spaced points due to tension whereby a profile of the tension distribution corresponding to undesired undulations in the shape of the finished strip under non-tensioned conditions is obtained.

---

This invention relates to a control apparatus and system for strip rolling, and more particularly to a control apparatus for use in a strip rolling mill which is capable of detecting potential variations in the flatness or the shape, especially undesired undulations in the shape of the finished strip under non tensioned conditions, during the rolling operation and which provides means for readily adjusting certain factors controlling the flatness or the shape of the strip while rolling. The roll shape, the screw down force and the strip tension are some of the known controlling factors in a strip rolling operation.

It is a standard requirement for a rolled strip of material, for example, metal that the finished or rolled strip have sufficient flatness or uniform shape as well as sufficient precision in its thickness. Control of the flatness of the strip, however, is found to be much more difficult than control of the thicknes in strip rolling operations. Possible undulations in the shape of the finished strip or product are hard to predict or detect during the rolling operation because the strip while being rolled is subjected to quite different conditions from those encountered by the finished product. Strips, especially in cold strip mills, are usually rolled by a pair of roller members under tension which is imparted thereto either by a coil winder or other roller members. Under these conditions the strips appear flat because of their elastic elongation due to the tension even though the finished strips as products may have considerable undulation in their shape upon the tension being removed. Consequently, known methods to detect potential variations in the flatness of a strip while being rolled have proven unsatisfactory. One of these known methods uses a pair of contacting rollers positioned apart across the width of the strip to detect the difference of the angular velocities therebetween as shown in U.S. Patent No. 3,078,747.

Undesired undulations in the shape of finished strips may be found even in cases where the strip has uniform thickness not only from end to end but from edge to edge. It is a finding of the inventor that undesired undulations in the shape itself have no direct detectable relation with the thickness of the strip. Many attempts to detect or control the flatness or the shape of the strip to avoid undesired undulations by measurement of its thickness have proven to be unsatisfactory for use in practical cold strip rolling mills. The features of this invention are concerned with this point and will be explained in greater detail later with reference to the drawings.

Accordingly, it is an object of the invention to provide a control apparatus which is capable of detecting potential undesired variation in the flatness or the shape of a strip of material being under a tension force.

Another object of the invention is to provide a detecting apparatus of this character which is capable of sensing the tension distribution imparted to the strip while being rolled at multiple spaced points across the width thereof including at least a point or part near the center thereof and providing a control signal corresponding to a profile of the tension distribution detected.

A further object of the invention is to provide a detecting apparatus which is comprised by a plurality of contacting means coupled with the strip under tension in such a manner that there takes place a displacement of the strip and each sensing means for measuring the force or load caused by the tension.

Still another object of the invention is to provide a simple and practical detecting device for detecting potential variations in the flatness or the shape of a strip being rolled which is comprised by a plurality of contacting rollers each being supported by supporting means and including a load sensing means, and means for providing a signal corresponding to the difference in the force between a plurality of points or parts across the width of the strip.

A still further object of the invention is to provide a control system to adjust certain controlling factors in the strip rolling process for controlling the flatness in accordance with the output of the detecting apparatus of the abovementioned character.

These and other objects and advantages of the invention will become apparent in view of the following description taken in conjunction with the accompanying drawings, wherein like reference numerals or legends are used to denote similar elements; and wherein:

FIGURE 1 is a schematic showing of a conventional cold strip rolling mill in which a control apparatus according to the invention is utilized;

FIGURE 2 is an explanatory showing of finished strips having undesired undulations in their shapes;

FIGURE 3 is an exaggerated showing of undulations in the finished strip after the same is removed from the rolls and no longer is under tension;

FIGURE 4 is an explanatory force diagram showing a force imparted to a contacting roller by a strip where the contacting roller gives a displacement to the strip under tension;

FIGURE 5 is a schematic view of a strip under tension showing elongation thereof under tension and the tension distribution;

FIGURE 9 is a more detailed cross sectional view of a portion of the apparatus shown in FIGURE 8;

FIGURE 10 is a schematic diagram of another embodiment of the invention;

FIGURE 11 is an enlarged schematic diagram of a portion of the apparatus shown in FIGURE 10;

FIGURE 12 is a schematic diagram of still another modified form of the invention;

FIGURE 13 is a partial sectional diagram of still another embodiment of the invention;

FIGURE 14 is a schematic block diagram of a control system for a strip rolling mill stand providing control of the flatness or the shape of strip according to the invention;

Figure 6:
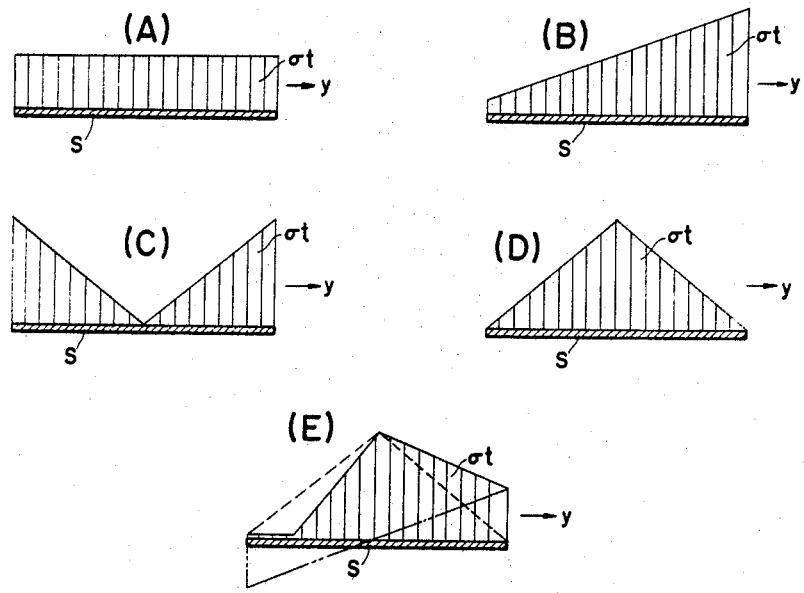
FIGURE 6 is a series of curves showing different tension distributions that can occur across the width of a strip.

Referring to FIGURE 1, a strip rolling mill stand 1 has a pair of working roller members 2, 3 and a pair of back-up roller members 4, 5. A strip S is rolled by the pair of working roller members 2, 3 under pressure to reduce its thickness to a predetermined value. During this rolling operation the strip is subjected to a tension force imparted by a coil winder 6 and a tension roller 7. In the drawings the direction of advance of the strip is shown by arrow $x$, the direction transverse to $x$, that is edge to edge direction, by arrow $y$, and the direction perpendicular to both $x$ and $y$, by arrow $z$.

The thickness of the strip is controlled and maintained at a desired value by use of a thickness gauge control system not shown. Though the strip has a desired thickness, however, it often happens that it has undesired undulations in its shape. FIGURE 2 shows two examples of these undesired undulations. FIGURES 2(A) and 2(B) are views of a part of a finished strip which has an undulating portion formed by hummocks or humps $u$ in its center though it has uniform thickness throughout from end to end and edge to edge. The undulations happen when the strip S before the bite of the working roller members has thicker central portions than both edge portions. FIGURES 2(C) and 2(D) show another example where the undulations $u$ in shape take place near the right edge portions of the strip.

Although undesired undulations of this nature can be easily observed or detected in finished strips, which no longer are under tension, it has not been possible, heretofore, to detect such potential undulations during the rolling operation. As previously indicated, elastic elongation due to tension makes the strip appear flat during the rolling operation. FIGURE 3(A) shows a perspective view of an undulated strip and FIGURE 3(B) illustrates a portion thereof which is exaggerated in size. This undulation in shape takes place when the corresponding lengths of portions at different points along one direction are not equal to each other. When a square portion of the strip is cut out by parallel lines $ab$, $a'b'$ in the $y$ direction, actual length $bb'$ in the $x$ direction is $l$ while $aa'$ is $l+\Delta l$. Thus, undulation takes place in the shape. However, since the portion is subject to a tension force T during the rolling operation, it looks as though it were flat as shown in FIGURE 5 because of elastic elongation of the $bb'$ side to $l+\Delta l$.

This invention has as its fundamental contribution the finding that the tension distribution observed during rolling operation in the strip subjected to tension, especially across its width, is itself an indication of potential undulation in shape of the finished strip which will take place therein under non-tension conditions. That is, within elastic limits, tension shared in each portion of the strip is proportional to its value of elongation under tension and is a measure of the undulation that will take place in the shape of the strip upon being released from tension. FIGURE 5 shows a tension distribution when the portion of the strip shown in FIGURE 3(B) is elongated under a tension force T, resulting the length $b$–$b'$ becoming $l+\Delta l$ from $l$.

There is a known method to detect undulations in shape of the strip by a conventional thickness gauge. By this method, the thickness gauge should have such resolution as to detect the variation in thickness due to the elongation of the strip. However, it is commercially impractical to construct such a precise thickness gauge with presently available technology. The degree of difference from flatness or undulation in the shape of the strip is shown by the ratio of an amplitude of a wave $\delta$ to its length $l$, $\delta/l$. To satisfy accepted stands $\delta/l$ is required to be less than 3.3%, and it is necessary therefore that the gauge should be able to detect undulations where $\delta/l=1.0\%$. Referring to FIGURE 3(B), there is the following relation between $\delta$ and $l$, assuming $l$ changes to $l+\Delta l$.

$$\delta = 0.61\sqrt{l \cdot \Delta l} \tag{1}$$

$$\Delta l/l = 2.58(\delta/l)^2 \tag{2}$$

Now, assume that no change in volume takes place accompanying the elongation.

$$lh = \text{constant} \tag{3}$$

wherein $h$ is the thickness of the strip. By differentiating Equation 3, $$\frac{\Delta h}{h} + \frac{\Delta l}{l} = 0 \tag{4}$$

Therefore, $$\frac{\Delta h}{h} = -\frac{\Delta l}{l} = -2.58 \, (\delta/l)^2 \tag{5}$$

Since it is necessary to detect the undulation where $\delta/l=1.0\%$, the thickness gauge is required to detect reduction in thickness on the order of $\Delta h/h=0.0258\%$. If $h=1.0$ mm., $\Delta h=0.258\mu$.

This order of reduction in thickness is not within the resolution of the most accurate thickness gauge that is practically used nowadays, since most such instruments possess a resolution which is at most $2\sim 3\mu$.

On the other hand, according to the invention, the undulations are easily detected in terms of the difference in the tension distribution. Referring to FIGURE 5, the tension in the strip $\Delta \sigma$ has the following relation with its elongation $\Delta l$ by Hooke's law.

$$\Delta \sigma t = \frac{\Delta l}{l} \cdot E = E \times 2.58 \left(\frac{\delta}{l}\right)^2$$

wherein E is Young's modulas. Similarly assuming that $\delta/l=1.0\%$ and the strip is of steel which has $2.1 \times 10^4$ kg./mm.$^2$ as Young's modulas, $$\Delta \sigma t = 2.1 \times 10^4 \times 2.58 \times 10^{-4} = 5.4 \text{ kg./mm.}^2$$

This value of tension is well within the resolution of a detecting apparatus made according to the invention.

It will be appreciated that according to the invention, the flatness or undulation in the shape of the strip can be detected, based on the finding previously explained. However, for use in a practical control system it is also necessary to detect the actual tension distribution across the width of the strip by practical and simple means. FIGURE 6 illustrates typical difference distributions of tension that can occur across the width of the strip S under tension. FIGURE 6(A) shows an ideal distribution, FIGURE 6(B) one which includes one side elongated, 6(C) one which includes two sides elongated with a central depression, 6(D) one which includes the center part elongated, and the two sides depressed, and 6(E) an actual distribution which is considered as combinations of previous ones.

One of the most simple detectors is to use a single tension roller which is supported at both ends near the edges of a strip by a pair of load cells as described in U.S. Patent 2,100,653, issued Nov. 30, 1937. Since such a detector can only tell the difference or unbalance in tension between the edges, it is impossible to detect the cases (C), (D) and even in the (B), (E) cases it cannot tell exactly what is the actual tension distribution across the width of the strip.

According to the invention, a plurality of detecting means are operatively coupled with a strip under tension in such a manner as to give a displacement to the strip. Each detecting means includes contacting means, for example rollers, aligned with each other across the width of the strip to receive a force or load proportional to the tension distribution. Each contacting means is rotatably supported by supporting means which contacts with sensing means to measure the force produced by the tension in accordance with the displacement of the strip. Further, there is provided means for producing a signal corresponding to a profile of the tension distribution. The profile of the tension distribution is, for instance, defined or detected by a combination of the difference in magnitude of the tension between the parts and the moment caused by distributed tension around a point or a contacting point of the sensing means.

Figure 7:
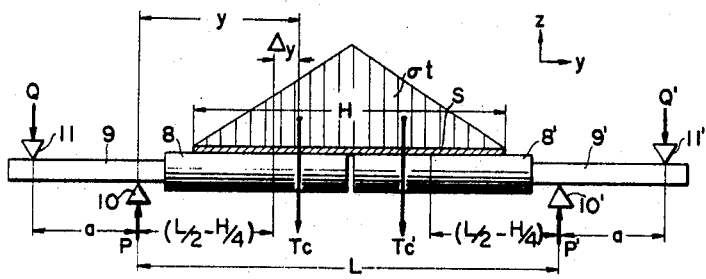
FIGURE 7 is a schematic diagram of a control apparatus embodying the teaching of the invention.

One embodiment of the invention using a pair of rollers as contacting means is schematically illustrated in FIGURE 7. A pair of rollers 8, 8' are supported rotatably by supporting member 9, 9' to make contact with a strip S across the width thereof, that is, along the y direction. The rollers 8, 8' are positioned either following or preceding a strip rolling mill stand 1 as shown in FIGURE 1. Also it is positioned fixedly against the strip S to give a little displacement so that it may receive a force or load $Tc$ proportional to the tension T as shown in the greatly magnified view of FIGURE 4. Because during a given rolling operation the relation between rollers 8, 8' and the strip S to roller members 2, 3 and roller 7 remains substantially fixed, the angle $\theta$ shown in FIGURE 4 is constant and $Tc=kT$ where $k$ is a constant. Supporting member 9 is functionally supported by a pair of load sensing means 10, 11. Though not shown, it will be noted that the supporting member 9 is supported loosely by guiding means so as not to move horizontally during operation. Further explanation will be given referring only to the roller 8 and the member 9 since the symmetrical configuration of the apparatus makes the description equally applicable to roller 8' and member 9', etc.

In FIGURE 7, H is the width of the strip S, L is the distance between the load sensing means 10, 10', and $a$ is the distance between the load sensing means 10, 11 or 10', 11'. P, Q and P', Q' are forces which are applied to the load sensing means, respectively, by the forces produced by the tension distribution $\sigma t$. The forces due to the tension distribute proportionally to the tension distribution and in the drawing they are shown as combined forces. $Tc$ for the roller 8 and $Tc'$ for the roller 8'.

By this configuration, $Tc$ an $Tc'$ are easily measured. That is, $Tc=P-Q$, $Tc'=P'-Q'$. If $Tc$ is not equal to $Tc'$, the distribution of the tension must be either the (B) or (E) case as illustrated in FIGURE 6. By adjusting some of the controlling factors for the shape of the strip, such as a screw down force, it is easy to make $Tc=Tc'$. Even if $Tc$ is equal to $Tc'$, the distribution is not uniform in such cases as (C), (D) of FIGURE 6. According to the invention, the position of the combined force $Tc$ is determined by measurement of the moment caused by $Tc$ around a contacting point of the sensing means 10.

Supposing that $Tc$ is positioned at a distance $y$ from the contacting point 10, the following relations are obtained by the balance of moment.

$$Qa=TcY$$

thus, $$Y=(Q/Tc)a=(Q/P-Q)a$$

If it is an ideal distribution, $y$ should be $(L/2-H/4)$. Therefore, as long as the measured value of $y$ is not equal to $(L/2-H/4)$, the distribution is not uniform. If $(Q/P-Q)a$ is greater than $(L/2-H/4)$, the distribution is one which shows both sides elongated as in FIGURE 6C, and one which shows central part elongated as in FIGURE 6D if $(Q/P-Q)a$ is greater than $(L/2-H/4)$. Therefore, if $\Delta y$ is detected as a control signal by the following relation, $$\Delta y = Q/P - Qa - (L/2 - H/4)$$

the tension distribution can be easily detected or predicted by observing the polarity and the magnitude of $\Delta y$. The same $\Delta y'$ signal may be, of course, obtained from the roller 8'. Consequently, adjustment of the rolls 2, 3 or other controlling factors can be chosen, depending upon the output signal $\Delta y$, or $\Delta y$ and $\Delta y'$, to be reduced. The load sensing means is preferably comprised by a conventional strain gauge in which detected tension forces are directly converted to proportional electrical signals without requiring any substantial accompanying displacement of supporting lever members.

Figure 8:
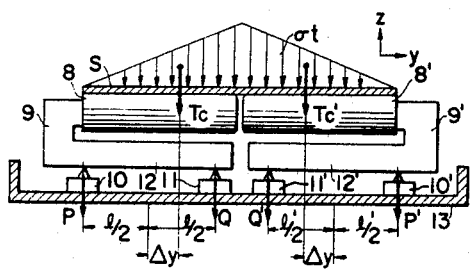
FIGURE 8 is a schematic diagram of a second apparatus according to the invention.

FIGURE 8 shows another embodiment of the present invention which needs less space for installation and in which the supporting member 9 is comprised by a roll supporting portion and a lever portion 12. The lever portion is bend L or U-fashion in the Z plane and extends back to the center of the strip and it is functionally supported by load sensing means 10, 11 at different points. It is supported in a manner such that the distance between the points 10 and 11 is substantially the same as the length of the roller 8. A more detailed construction of the apparatus is shown in FIGURE 9(A), (B). A tubular roller 8 is rotatably supported through bearings 14, 15 by a shaft 9a which is a part of supporting member 9. The load sensing means 10, 11 are supported by a horizontal frame member 18. The supporting member 9 is loosely supported or guided by guiding members 16, 17 to prevent horizontal movement thereof. Preferably, an elongated elliptical hole 19 is provided in the member 9 through which a pin 20 secured to the guiding member 16 passes to maintain desired relative position between the guiding member 16 and the supporting member 9. To guide the member 9, other manners such as, dove-tail guide may be used. FIGURE (B) is a side sectional view taken along the line 1xB—1xB of FIGURE 9(A).

According to this embodiment shown in FIGURE 9, combined forces $Tc$, $Tc'$ are obtained by the balance of forces, as sums of P, Q and P', Q', that is $Tc=P+Q$, $Tc'=P'+Q'$. By the balance of moment around the contacting point of means 10, the position of the force $Tc$ is determined as follows, $$Tc\left(\frac{l}{2}+\Delta y\right)=Ql, \text{ thus } \Delta y = \frac{Q-P}{P+Q}l$$

where $l$ is the distance between the points 10 and 11.

However, the width of the strip is not necessarily equal to the distance between the contacting points of means 10, 11. Therefore from a practical point of view, compensation of the variation in the width of the strip is required. This is easily accomplished by multiplying a variable coefficient $\alpha$ with P. Hence, $$\Delta y = \frac{Q-\alpha P}{P+Q}l$$

FIGURE 10 shows another embodiment of the invention in which a roller 8 and a lever portion 12 are supported at both ends by supporting members 9b, 9c, respectively. Though any number of contacting rollers of this design may be arranged in alignment across the width of the strip in accordance with this embodiment, there is a little disadvantage that arises due to a non-contacting portion in the strip with the roller. This non-contacting portion is shown by a gap $d$ which may hurt the surface of the strip. Possible damage to the strip by the roller is reduced by making its edge round. This configuration of FIGURE 10 is preferred when the tension distribution is extremely complicated so as to contain multiple maximum points. FIGURE 11 shows a generalized schematic diagram of this embodiment. Similarly to the apparatus shown in FIGURE 8, there are the following relations, $$Tcn = Pn + Qn, \quad \Delta yn = \frac{Qn - \alpha Pn}{Pn + Qn} l, \quad 0 \leq \alpha \leq 1$$

It will be clear that the actual profile of the tension distribution is obtained by the above relations and that from this profile information a signal necessary to control the flatness or the undulation in shape can be obtained. In case variations of $Tcn$ is small, $\Delta yn$ is considered proportional to $Qn - \alpha Pn$ so that $Qn - \alpha Pn$ may be used for control instead of $\Delta yn$. In case the gap $d$ results in damage to the surface of the strip, a pair of back up rollers 21, 22 shown in FIGURES 12A and 12B may be employed. FIGURE 12B is a side sectional view of the apparatus in FIGURE 12A taken along the line $x11B$—$x11B$.

Though a pair of load sensing means 10, 11 are employed for each roller 8 in the embodiment of the invention heretofore explained, a single load sensing means 24 may be employed for each roller provided that a sufficient number of rollers 23 are aligned with each other along the width of the strip as shown in FIGURE 13. A plurality of tubular rollers 23 are each supported on a respective supporting member 25 by means of a pair of bearings. The supporting member 25 is guided by a member 26 which is connected with the member 25 by a loose key mechanism 27 so as to prevent the roller 23 from moving around. By this configuration the tension on sufficient multiple spaced points including a plurality of points near the center is measured so that the tension distribution corresponding to the potential undulation in shape of the strip is likewise detected.

After the potential undulation in the shape of the finished strip is detected by means of unbalance in the tension distribution as set forth above, a control signal corresponding to the unbalance in the tension distribution may be used to adjust one of the controlling factors of the shape of the strip. FIGURE 14 shows one embodiment of a control system according to the invention in which such a control signal is used to adjust the contour or sectional area of the working gap formed by a pair of working roller members.

In FIGURE 14, a control or detecting apparatus similar to that shown in FIGURE 7 is disposed along the strip path, and operates to develop output signals representative of $P-Q$ and $P'-Q'$. Conventional differential amplifier means 28, 28' are provided which utilize the signals to develop a set of combined force signals $Tc$, $Tc'$ in which $Tc$ is equal to $P-Q$ and $Tc'$ is equal to $P'-Q'$. A third conventional differential amplifier means 29 provides the difference between $Tc$ and $Tc'$, that is, $Tc-Tc'$. Thus, unbalance in the forces which are shared by respective rollers is detected. A conventional differential ratio means 30 provides a signal proportional to $\Delta y$, that is $$\frac{Q}{P-Q} \alpha - \left(\frac{l}{2} - \frac{H}{4}\right)$$

The strip rolling mill stand shown at 1 includes adjusting means to adjust a screw down force. The adjusting means includes a pair of screw down motors 37 and 37' which lift or push down journals 34, 34' coupled with a back-up roller member 4. 38 is a coupling device, 39 is an upper part of the mill stand 1, and 33 is a journal for the roller member 5. By this configuration, either side of the screw down forces of the back-up roller member 4 is adjusted according to the polarity and the magnitude of the output signal of the differential amplifier means 29, that is, $Tc-Tc'$, whereby the shape of the strip is adjusted to be symmetrical. Although undesired undulation in shape such as those shown in FIGURE 6(B) can be adjusted to an ideal one as shown in FIGURE 6(A), with the apparatus thus far described, non-uniform but symmetrical tension distributions such as those shown in FIGURE 6(C), (D), (E) cannot be corrected without additional means.

In the strip rolling mill control system of FIGURE 14 such additional means also are provided in the form of a shape adjusting means which are comprised by journals 40, 40' and 41, 41' with working roller members 2, 3 and oil pressure runs 42, 42' controlled by oil pressure. According to the oil pressure provided, the runs 42, 42' move the journals 40, 40' up or down and thereby bend the working roller member 2 at the midpoint thereof as a fulcrum transversely to the advancement of the strip. This is well known as a roller bending operation. The oil pressure is controlled through a conduit 32 and a valve 31 by the turning moment output signal of the means 30, i.e. $\Delta y$. Thus the contour or sectional area of working gap, formed by the roller members 2, 3 may be varied symmetrically with each other side, so that the shape of the strip may be controlled to have an ideal tension distribution where $\Delta y$ is equal to zero.

Figure 15:
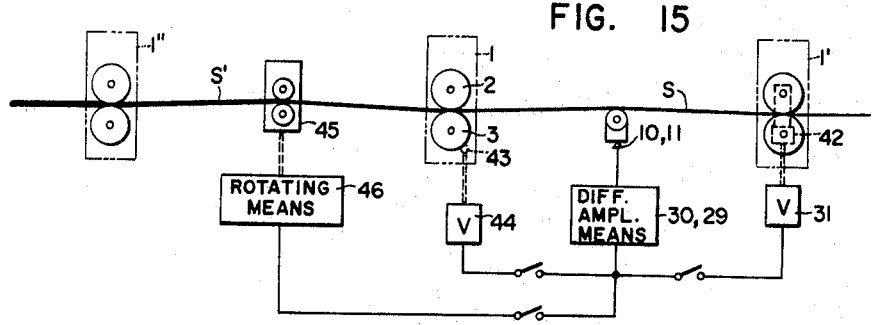
FIGURE 15 shows other embodiments of control apparatus for controlling flatness or the shape of the strip according to the invention.

There are other methods in strip rolling to control the contour or sectional area of the working gap than the screw down controlling operation and the roller bending operation. One end of a working roller member may be moved parallel to the advancement of the strip so as to twist the axis of the one roller member against the other to control the contour of the working gap. Another method is the hydraulic roll shape control by changing the thickness of a lubricant oil layer along its length of a roller surface. FIGURE 15 shows such different control systems according to the invention to adjust one of the control factors. In FIGURE 15 a strip rolling mill stand 1 is provided with a lubricant oil spray means 43 which is positioned close to the surface of the working roller member 3. The spray means has a number of orifices along the length of the roller member 3 and the supply of oil through the individual orifices is controlled through valve means 44 by signals $Tc-Tc'$, and $\Delta y$ of the tension distribution detecting means 30, 29.

The output signal of the tension distribution detecting means may also be used to adjust the tension distribution of the preceding portion of the strip $S'$. A tension roller 45 which is designed to give an unbalanced tension distribution to the strip $S'$ with torsional movement is operably controlled through rotating means 46 by the tension distribution detecting means to control the shape of the strip so as to have uniform tension distribution. Although in the foregoing description, the control factors for avoiding undesired undulations in the strip are applied at the preceding strip mill stand, the control factors may be, of course, applied at the succeeding strip mill stand either of or in conjunction with the preceding stand as shown in FIGURE 15.

Figure 16:
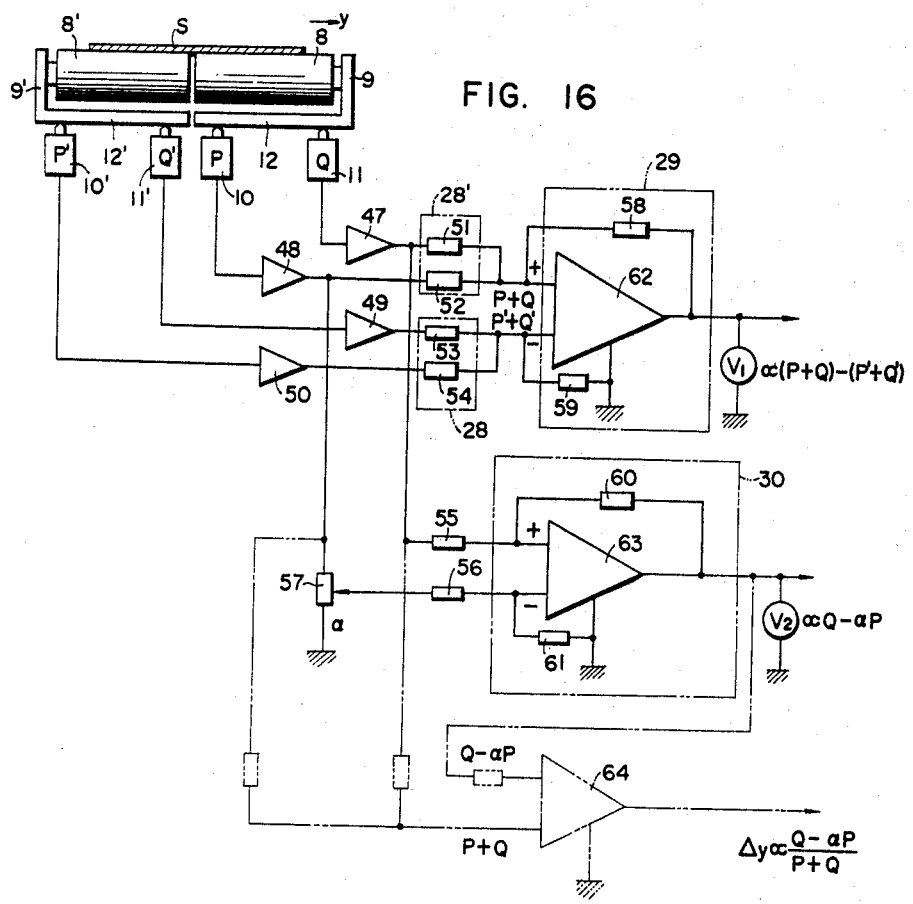
FIGURE 16 is a diagrammatical circuit sketch of an error signal deriving circuit to provide a signal corresponding to a profile of the tension distribution across the width of a strip being rolled, and suitable for use in the control system of FIGURE 14.

FIGURE 16 shows one embodiment of a suitable differential means used in the system of FIGURE 14, in which the same tension distribution detecting means as shown in FIGURE 8 is employed. Output signals from load sensing devices 10, 10', 11 and 11' are amplified by conventional amplifiers 47 through 50, respectively. The amplified signals are added through summing resistors 51, 52, and 53, 54, respectively, to give signals $P+Q$, $P'+Q'$. The added signals are provided to positive and negative terminals of a conventional differential amplifier 29, respectively. The differential amplifier 29 provides an output signal $V_1$ corresponding to $(P+Q)-(P'+Q')$. Resistors 58 and 59 are feedback resistors to make the operation of the amplifier $A_1$ accurate. The amplifier signals from the amplifier 47 and 48 are further provided to another differential amplifier 30 through resistors 55, 56 and an adjustable resistor 57 which functions as a means for compensating for strip width variations. The output $V_2$ of the amplifier 30 corresponds to $Q-\alpha P$ which is considered proportional to $\Delta y$ when $(P+Q)$ remains substantially unchanged. However, if it is necessary actually to detect $\Delta y$, the circuit which is shown by broken lines may be employed since the ratio amplifier means 64 provides a signal which is actually proportional to Δy. A signal Δy', or Q'−α'P' may be, of course, obtained by similar circuits from the roller 8'.

From the foregoing description it will be appreciated that according to the invention the flatness or the potential undesired undulations in the shape of a finished strip not under tension are detected in any case by means of detecting and defining a profile of the tension distribution across the width of the strip during the rolling process and further that adjustment or control of the flatness or the undulation during the strip rolling process is accomplished in accordance with the detected undulation in the shape. For this purpose the invention makes available a new tension profile measuring or detecting apparatus and control system employing such apparatus.

The invention having been described in connection with certain embodiments thereof, it will now be understood that further modifications may now suggest themselves to those skilled in the art and it is intended to cover such modifications as fall within the scope of the appended claims.

I claim:

1. An apparatus for detecting potential undesired variations in the shape of a strip of material to which a tension force is imparted, said apparatus comprising first means operably coupled with said strip under the tension force for sensing the tension at multiple spaced points across the width of the strip including at least one point between the edge parts thereof and second means operably coupled with said first means for providing a signal corresponding to a profile of the distribution of the tension imparted to said strip across the width thereof, said second means comprising means for deriving a differential force signal representative of the difference in force produced at the multiple spaced points due to tension in the strip, and means for deriving a turning moment signal representative of the turning moment produced about at least one of the spaced points due to tension whereby a profile of the tension distribution corresponding to undesired undulations in the shape of the finished strip under non-tensioned conditions are obtained.

2. An apparatus according to claim 1 in which said first means is comprised by a plurality of detecting means operably coupled to the strip under the tension force and aligned with each other across the width of the strip in such a manner as to give a displacement to the strip; each of said detecting means including contacting means for contacting the strip, supporting means for operably supporting said contacting means, and sensing means operably coupled with said supporting means for measuring a force which is produced by the displacement of said strip under the tension force.

3. An apparatus according to claim 2 in which said second means is operably connected with the plurality of said sensing means for providing a signal corresponding to the profile of the distribution of the tension across the width of the strip by comparison of the sensed output signals of the plurality of said sensing means.

4. An apparatus according to claim 3, in which said plurality of contacting means is comprised by a plurality of axially aligned rollers rotatably supported by said supporting means and operably engaging said strip under tension.

5. An apparatus according to claim 4 in which said sensing means is comprised by a pair of load sensing devices in engagement with said supporting means at spaced points for producing signals proportional to loads imparted thereto, respectively.

6. An apparatus according to claim 2 in which said sensing means is comprised by at least one load sensing device producing a signal proportional to a load imparted thereto and said supporting means is essentially supported with said load sensing device in a direction substantially tangential to the movement of said strip.

7. An apparatus according to claim 2 further comprising guiding means coupled with each supporting means for guiding the supporting means in such a manner that the contacting means associated therewith contacts with said strip in alignment with the other contacting means.

8. An apparatus according to claim 5 in which each supporting means includes a supporting member rotatably coupled with said roller and a lever member statically contacting with said pair of load sensing devices at spaced points.

9. A device according to claim 5 in which each roller has a longitudinal axis and is rotatably supported by said supporting means at one end of the longitudinal axis thereof.

10. A device according to claim 5 in which each roller has a longitudinal axis and is rotatably supported by said supporting means at the both ends of the longitudinal axis thereof.

11. A device according to claim 8 in which said roller has a longitudinal axis and is rotatably supported by said supporting member at one end thereof and said lever member has a longitudinal axis which extends in a direction opposite to the longitudinal axis of said roller.

12. An apparatus according to claim 9 in which said supporting means includes a first supporting member by which said roller is supported and a second supporting member comprising said lever member whereby said roller and said lever member are supported in spaced-apart parallel relationship.

13. An apparatus according to claim 5 in which said second means includes means operably connected with each pair of said load sensing devices for producing a signal corresponding to the difference in a combined total force produced on individual rollers by the tension force applied to said detecting means.

14. An apparatus according to claim 5 in which said second means further includes means operably connected with at least one pair of said load sensing devices for producing a signal corresponding to the turning moment produced about at least one of said load sensing devices.

15. An apparatus according to claim 13, in which said second means further includes means producing a signal proportional to the sum of the output signals of the load sensing device in each pair and means for producing a signal proportional to the difference in the sum between at least two pairs of the load sensing devices.

16. An apparatus according to claim 13, wherein said second means further comprises means operably coupled with one of the load sensing devices of at least the one pair located at either edge of the strip for compensating for variations of the width of said strip.

17. An apparatus according to claim 5, in which said second means is operably connected with at least one pair of load sensing devices and includes means for producing a turning moment signal corresponding to the difference in distance between the center point of the strip width related to the length of the roller and the center of the combined forces produced by the tension of the strip.

18. In a rolling mill including a first device having a pair of roller members between which a strip of material is positioned for performing a predetermined operation relative to said strip and having a control means operably coupled with at least one of said roller members for controlling the contour or sectional area of the working gap formed by said pair of roller members so as to control the shape of the strip across the width thereof, with said rolling mill further including a second device operably coupled with the strip for imparting a tension force to the strip, the combination of a plurality of detecting means operably coupled with said strip under tension and aligned across the width thereof with each other for detecting the tension forces on multiple spaced points across the width thereof including at least one point between the edges thereof so as to provide plural signals corresponding to the tension at the individual points, and second means operably coupled with said detecting means and with said control means for providing an error signal corresponding to the tension distribution across the width to said control means, said second means comprising means for deriving a differential force signal representative of the difference in force produced at the multiple spaced points, and means for deriving a turning moment signal representative of the turning moment produced about at least one of the spaced points due to tension, said control means controlling the contour of the working gap according to said signal.

19. A control apparatus according to claim 18 in which said first device includes journals for each end of said pair of roller members and a back-up roller member operably coupled with said each roller member and said control means includes pressure means at the ends of said roller members for moving the journals for controlling the contour of working gap formed by the pair of said roller members according to the signal from said second means corresponding to the difference in the tension distribution across the width of the strip.

20. A control apparatus according to claim 18 in which said control means includes means disposed along the width of one of said roller members for supplying oil to said one roller member to thereby control the contour of the working gap of said roller member by means of the hydraulic shape control.

References Cited

UNITED STATES PATENTS

| | | | |
|---|---|---|---|
| 2,674,127 | 4/1954 | Garrett et al. | 73—159 |
| 2,809,519 | 10/1957 | Kaestner | 73—159 |
| 3,081,651 | 3/1963 | Roberts | 72—205 |
| 3,315,506 | 4/1967 | Schneider | 72—9 |
| 3,334,508 | 8/1967 | Martin | 72—364 |

MILTON S. MEHR, Primary Examiner

U.S. Cl. X.R.

72—12, 205